United States Patent [19]
Delrosso et al.

[11] Patent Number: 5,515,200
[45] Date of Patent: May 7, 1996

[54] COMPACT-SIZE OPTICAL AMPLIFIER HAVING SEPARATE FUNCTIONS

[75] Inventors: Giovanni Delrosso, Caltignaga; Stefano Vanoli, Verdellino; Massimo Armiraglio, Bottanuco, all of Italy

[73] Assignee: Pirelli Cavi S.p.A., Milan, Italy

[21] Appl. No.: 144,820

[22] Filed: Oct. 28, 1993

[30] Foreign Application Priority Data

Oct. 30, 1992 [IT] Italy .................... MI92A2500

[51] Int. Cl.$^6$ .................... H01S 3/00; G02B 6/00
[52] U.S. Cl. .................... 359/341; 385/135
[58] Field of Search .................... 385/135, 88, 89, 385/92; 359/341

[56] References Cited

U.S. PATENT DOCUMENTS

| | | | |
|---|---|---|---|
| 4,861,134 | 8/1989 | Alameel et al. | 350/96.20 |
| 5,011,256 | 4/1991 | Johnson et al. | 350/96.20 |
| 5,355,248 | 10/1994 | Hadjifotiou | 359/341 |
| 5,363,385 | 11/1994 | Heidemann | 372/6 |
| 5,383,051 | 1/1995 | Delcosso et al. | 359/341 |

FOREIGN PATENT DOCUMENTS

| | | | |
|---|---|---|---|
| 2087681 | 5/1982 | United Kingdom | H04B 9/00 |
| 2194700 | 3/1988 | United Kingdom | H04B 9/00 |
| 2254194 | 9/1992 | United Kingdom | H05K 7/14 |

OTHER PUBLICATIONS

Patent Abstracts of Japan, vol. 16, No. 345 (P-1392) Jul. 1992 Abstract.
AT&T Bell Laboratories Technical Journal, vol. 71, No. 1, Jan. 1992, N.Y., US pp. 53–62.

*Primary Examiner*—Mark Hellner
*Attorney, Agent, or Firm*—Brooks Haidt Haffner & Delahunty

[57] ABSTRACT

An optical amplifier (1) includes optical components including at least one optical amplifying active fiber and a pump laser supplying pumping power to the amplifying fiber through an optical coupler, light guide sections (14) for connecting the optical components, and electronic and electrical power supply and control components (41,42). The amplifier is characterized in that it includes:

an optical unit (15) including all the optical components (2–13) and the connection light guide sections (14), an electronic unit (16) including all the electronic and electrical components (41,42) and being separate from the optical unit (15), a plate between the optical unit and the electronic unit; and electrical interconnections (43,44) between the optical unit (15) and the electronic unit (16).

The clear separation of the electronic components (41,42) from the optical components (2–13) affords size reductions and rationalization of the amplifier (1) implementation procedure.

9 Claims, 3 Drawing Sheets

COMPACT-SIZE OPTICAL AMPLIFIER HAVING SEPARATE FUNCTIONS

RELATED APPLICATION

This application relates to compact optical amplifiers of the type described in U.S. application Ser. No. 145,472, filed Oct. 28, 1993 in the names of the inventors named herein and now U.S. Pat. No. 5,383,051, issued Jan. 17, 1995.

BACKGROUND OF THE INVENTION

1. Field of the Invention

This invention relates to an optical amplifier. Optical amplifiers are devices useful to optically (i.e., without conversion to electrical or other signal types) amplify light signals being propagated through a fiber optics line.

2. Description of Prior Art

In particular, so-called "on-fiber" amplifiers are known wherein the amplifier element comprises a section of an active light guide as obtained by a doping process using special substances (typically rare earths); in going through that light guide section, the optical signal is amplified by pumping light energy from laser sources.

Occasionally, the amplification is split between two amplification stages, that is, two discrete sections of the active light guide. Two-stage optical amplifiers have been known, for instance, from U.S. Pat. No. 5,115,338 and European Patent Application EP 0509577.

The implementation of optical amplifiers, particularly two-stage ones, is far from being a straightforward process, it involving, in particular, a large number of light guide splices; also, the process is made the more difficult by the need to keep the amplifier space requirements low.

The active light guide sections tend to be fairly long—not infrequently several tens of meters long—and cannot be convoluted to an excessively small bending radius for fear of attenuating the signal of possibly damaging the light guide beyond repair. In addition, the amplifier is to also accommodate a number of optical, electronic, and electrical components.

Lastly, several interconnection light guide sections must be provided between the various components which require to be sufficiently long; indeed, light guide splicing problems are likely to be encountered (during the amplifier assembly process), whereby some light guide excess length must be conceded to allow for reiterate splicing of the light guide.

Further, the splicing operation requires that purposely designed equipment be operated close to the amplifier outer case, on the exterior thereof for space reasons; it is also on this account that a sufficient length of the light guide should be made available for use as a starter to said equipment during the assembly process.

In the field of devices attendant to fiber optics lines, joining devices are known—particularly intended for light guides including a large number of individual fibers—which address the problem of providing for a rational setting of the light guide allowance within a case. Devices of this kind are known, for instance, from U.S. Pat. No. 4,428,645; U.S. Pat. No. 4,679,896; U.S. Pat. No. 4,687,289 and U.S. Pat. No. 4,619,499.

It should not be overlooked, however, that the problems affecting the joining devices differ from those of optical amplifiers. In fact, joints include no other optical or electrical components besides the light guide, whereby the difficulties inherent to the mutual optical connection of several components, as are typical of an optical amplifier, are non-existent there. Further, the demand for compact size is more stringent on an optical amplifier, despite this being a much more complicated construction than a joint; indeed, whereas a joint is normally a stand-alone component somewhere along a light guide, an amplifier requires to be housed inside a cabinet or a cabin together with other components.

In a typical arrangement including a single amplification stage, an optical amplifier would comprise optical components (with this term encompassing all its components, whether purely optical or opto-electrical, which have at least one input or output port for optical signals), such as a section of an active light guide, a dichroic coupler, a pump laser source arranged to act on the active light guide section through the dichroic coupler, a directional coupler associated with a respective optical meter, and light guide sections interconnecting the various optical components, as well as electronic components (meaning all those components which involve purely electrical connections and no optical connections) electrically connected together for powering and controlling the optical components.

Where plural amplification stages are used, the number of the components would increase; as an example, in a typical two-stage arrangement, the optical amplifier would comprise two sections of an active light guide, two dichroic couplers, two pump laser sources acting on the active light guide sections through the dichroic couplers, two directional couplers associated with two respective optical meters, and light guide sections interconnecting the various components.

SUMMARY OF THE INVENTION

This invention concerns an amplifier of this type, having one or more stages and comprising electronic and optical components which include at least one active light guide section and a pump laser source acting on the active light guide section via optical coupling means, and light guide sections interconnecting the optical components, characterized in that it comprises:

an optical unit comprising all the optical components:

an electronic unit comprising the electronic components:

a parting plate spatially separating the optical unit from the electronic unit; and means of functional interconnection between the optical and the electronic units extending through the parting plate and consisting of purely electrical connections.

A laser source (laser for brevity) is an element, preferably a laser diode, operative to issue coherent light at a predetermined wavelength. The optical coupling means are means effective to couple signals from different light guides into a single light guide, specifically to couple into the active light guide the pumping signal issuing from the pump laser source and the transmission signal; preferably, a fused fiber dichroic amplifier is employed. Functional connection means a connection which enables signals to be exchanged, that is, to the exclusion of a purely mechanical securement.

By having the electronic and optical components clearly separated, the amplifier implementation operations can be rationalized. In fact, the implementations of the two, optical and electronic, units can be performed separately, in different environments, by specifically qualified personnel for either using different equipment. In particular, since the mope critical unit to have implemented is the optical one (wherein the several splices between light guides are to be provided, inter alia), the optical technician can complete the optical unit in a dedicated shop under a controlled (above all dust-free) atmosphere and using appropriate equipment. An electronic technician will later apply the electronic unit to the optical one, by just establishing the electrical connections therebetween.

Preferably, in order to enhance the rationalization of the joining step for the two units, the optical and electronic units are overlaid and the means of electrical connection arranged to extend along substantially vertical directions.

Advantageously, inasmuch as the electronic unit would include, of preference, an electronic board (carrying one or more printed circuits, integrated circuits and/or discrete components), the means of electrical connection comprise pins standing upright on the optical unit and corresponding receiving and/or soldering sockets formed in the electronic board. In this way, the interconnection between the two units can be made a straightforward job.

The optical unit may be implemented in various ways. Preferably, the optical components further include a directional coupler (2,12) associated with a respective optical meter (3,13), and an optical insulator (4,11), and the optical unit (15) comprises:

a base plate (17);

an organizer frame (18) mounted on the base plate (17);

a winding drum (22,23) with the active light guide section (7,10), being mounted on the underside of the organizer frame (18);

a window (29) through the organizer frame (18) for securing the laser source (6,9) on the plate (17), working through the organizer frame (18);

a socket (33) formed on the organizer frame (18) for securing the optical meter (3,13);

receiving sockets (24,25,34) formed on the organizer frame (18) for the optical coupling means (5,8), the directional coupler (2,12), and the isolators (4,11);

openings (35) formed through the organizer frame (18) to pass the light guide sections therethrough; and gathering means (36,37) provided on the organizer frame (18) top to gather up the connection light guide sections (14).

The term "optical meter" is used herein to identify a component, preferably a photodiode, operative to measure the strength of an optical signal. The term "directional coupler" means a component operative to split an input optical signal into two fractions to two outgoing light guides; as an example, an on-fiber coupler is employed which has a separation ratio of 95/5 between the direct and deflected signals.

A configuration as above enables the layout of the various optical components to be rationalized, which reflects in reduced bulk of the optical unit and, hence, the amplifier, as well as easier implementation of the optical unit. In fact, all the optical components are, prior to being connected together, mounted individually on the organizer frame, partly before and after the latter has been assembled to the base plate: the connection light guide sections associated with each component are passed above the organizer frame through the openings therein, and splicing is fully performed above the organizer frame.

For enhanced convenience in laying the allowance light guide sections, the gathering means preferably comprise a raised peripheral edge of the organizer frame, whereby the organizer frame top is given a substantially tray-like pattern. Thus, the light guide sections are taken into large coils arranged to lean against the peripheral edge and to be retained thereby. Preferably, the peripheral edge has inwardly projecting elevations for improved retention of the light guide coils.

Advantageously, the pump laser source (6,9) is mounted askew in a central area of the organizer frame and the base plate. This mounting is favorable to the dissipation of heat generated by the laser; indeed, with the plate made preferably of a heat conducting material, the whole surface becomes involved in the dissipation of heat, which keeps the temperature in the laser neighborhood low.

As previously mentioned, an amplifier embodying this invention may include one or more amplification stages. With two amplification stages, it is advantageous that the two active light guides be wound on respective drums, to be mounted on the organizer frame side-by-side; in addition, the two pump laser sources would preferably be enclosed within a common body, as would the two optical meters.

BRIEF DESCRIPTION OF THE DRAWINGS

Further features and advantages of an optical amplifier according to the invention will become apparent from the following detailed description of a preferred embodiment thereof, to be read in conjunction with the accompanying drawings. In the drawings.

DESCRIPTION OF PREFERRED EMBODIMENTS

Figure 5:
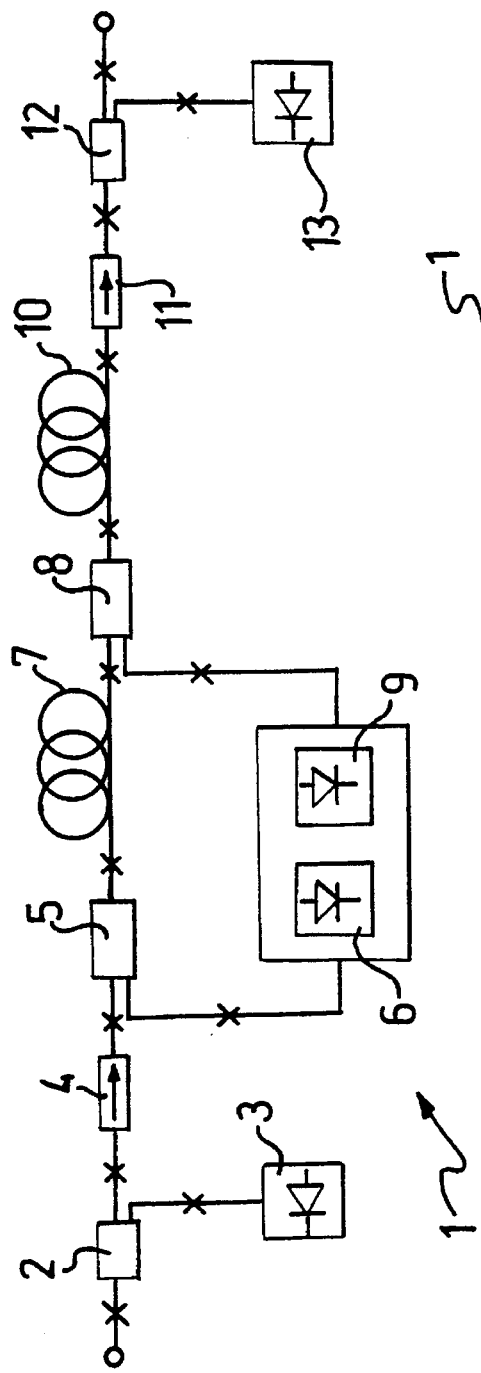
FIGS. 5 and 6 are (optical) circuit diagrams of two variations of the amplifier in FIG. 1.

In the drawings, generally shown at 1 is an optical amplifier, e.g. a two-stage amplifier, comprising (in this order along the optical path, in the embodiment shown in FIG. 5) a first directional coupler 2 connected to a first optical meter 3, first isolator 4, first dichroic coupler 5 connected to a first pump laser source 6, first active light guide section 7, second dichroic coupler 8 connected to a second pump laser source 9, second active light guide section 10, second isolator 11, and second directional coupler 12 connected to a second optical meter 13. The light guide sections interconnecting the various components are all indicated at 14 and comprise length allowances for splicing, and re-splicing should the former comes out bed.

As previously mentioned, this layout (shown in FIG. 5), wherein energy is pumped through the active light guide sections concurrently with the optical signal direction of propagation, is only given by way of example. The various components may be connected in a different way, such as that described in the aforementioned European Patent Application EP 0509577, wherein the input stage pumping occurs in the opposite direction. Depending on the amplifier type, one or both of the isolators 4 and 11 could be omitted or located elsewhere.

Figure 6:
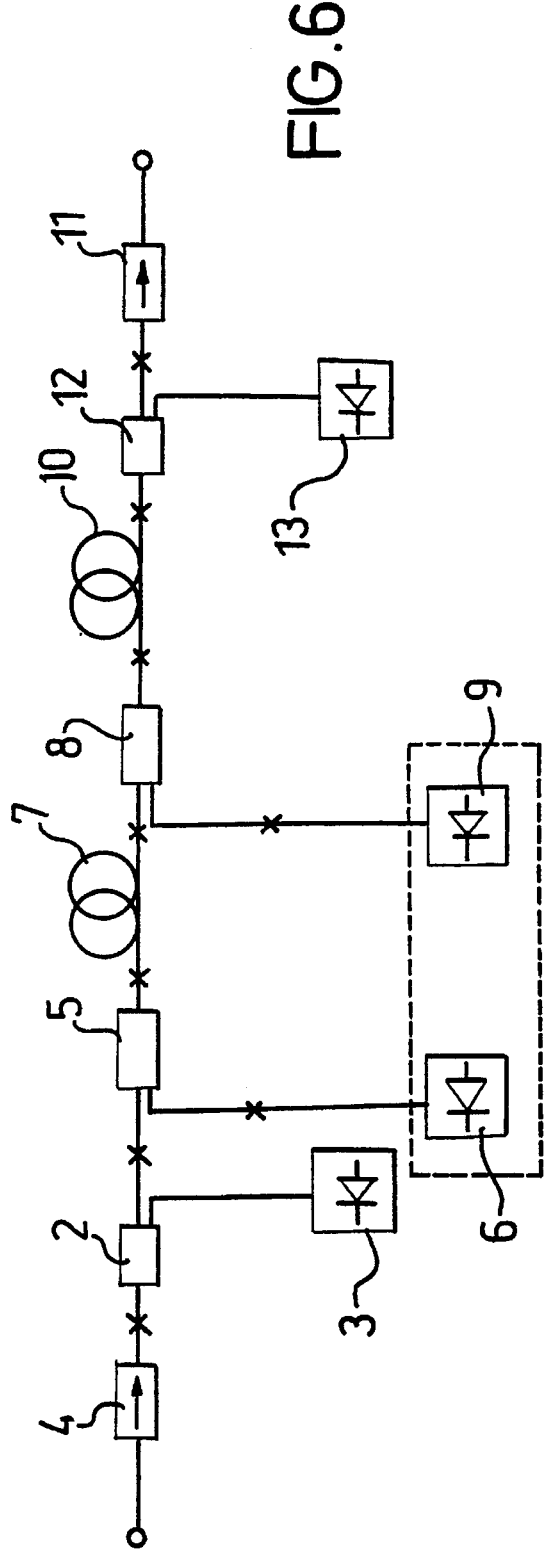

Another option is shown in FIG. 6. The amplifier 1a shown therein comprises the same components as amplifier 1 (identified in the Figure by the same reference numerals) but differently connected together. Thus, the amplifier 1a comprises, in this order along the signal direction of propagation through the light guide, the first isolator 4, first directional coupler 2 connected to the first optical meter 3, first dichroic coupler 5 connected to the first pump laser source 6, first active light guide section 7, second dichroic coupler 8 connected to the second pump laser source 9, second active light guide section 10, second directional coupler 12 connected to the second optical meter 13, and second isolator 11.

The difference between the two amplifiers 1 and 1a resides in the different monitoring actions which are applied thereto by the optical meters 3 and 13. In amplifier 1, the optical meters 3 and 13, being connected next ahead of and after the amplification stages, yield a highly accurate indication of the resultant overall gain; by contrast, in amplifier 1a, the meters 3 and 13 are connected externally of any other components and, therefore, yield a highly accurate indication of the overall effect of the amplifier 1a on the fiber optics line.

From many aspects of this invention, the two amplifiers 1 and 1a are substantially equivalent, and accordingly, reference will mainly be made hereinafter to amplifier 1 (but where otherwise stated), it being understood that similar considerations would also apply to amplifier 1a.

The amplifier 1 comprises an optical unit 15 and an electronic unit 16, as well as means of electrically interconnecting said units.

The optical unit 15 includes a base plate 17 made of a heat-conductive material (such as a metal) and an organizer frame 18. The plate 17 has a front portion 19 provided with an input 20 and an output 21 for connection to the fiber optics line. The input 20 and output 21 are implemented by two respective light guide bushings which may incorporate the isolators 4 and 11, where the amplifier is that shown diagramatically in FIG. 6.

The two active light guide sections or active optical amplifying fibers 7 and 10 are wound on respective drums 22 and 23 being carried on the organizer frame 18 and fastened to the underside thereof in side-by-side positions.

The organizer frame 18 is formed with elongate sockets 24 and 25 extending lengthwise at side locations on the frame 18, namely four downward-facing sockets 24 and two upward-facing sockets 25.

The sockets 24 and 25 accommodate the dichroic couplers 5 and 8, the directional couplers 2 and 12, and the isolators 4 and 11. Specifically, the sockets 24 would be used of preference (in order to leave as much free space as possible above the frame 18) and the sockets 25 left vacant, or omitted altogether, if one or both of the isolators 4 and 11 are omitted or incorporated to the input 20 and the output 21; otherwise, the directional couplers 2 and 12 would be placed of preference in the top sockets 25 as the smaller size components, leaving the bottom sockets 24 available for the dichroic couplers 5, 8 and the isolators 4, 11.

The pump laser sources 6 and 9 are enclosed within a single common body 26 provided with two opposingly aligned optical outputs 27 and 28. The body 26 is set obliquely on the plate 17 through a window 29 opened in the organizer frame 18, at a central location relative to the plate and the frame, between the two drums 22 and 23.

Preferably, the optical meters 3 and 13 are enclosed within a single common body 30 having two side-by-side parallel optical outputs 31 and 32. The body 30 is fitted into a socket 33 set obliquely across the organizer frame 18 at one of the two drums, e.g. drum 23.

The light guide sections are connected together by splices 34 in the form of small cylinders which would create enlargements on the light guide on account of the protective coatings applied thereover. In the drawings, only a few of such splices have been shown.

The organizer frame 18 is formed with openings 35 for passing the light guide sections from above and from beneath.

The optical unit 15 includes a gathering arrangement for the light guides, located atop the organizer frame 18. This arrangement comprises an upper peripheral edge 36 raised above the frame 18; the edge 36 imparts a substantially tray-like shape to the top portion of the frame 18. The edge 36 is formed with inwardly projecting elevations 37 for improved retention of the light guides and the splices 34, and a more convenient lay of same.

The radius of the drums 22 and 23 is not smaller than the minimum admissible bending radius for the light guides. Likewise, the width of the organizer frame 18 is selected such that the light guides gathered up inwards of its top edge 36 can have a convolution radii not smaller than the minimum admissible bending radius of the light guides. A preferred minimum admissible bending radius for the light guides within the amplifier 1 is 22 mm.

The optical unit 15 is closed at the top by a cover 38 in the form of a plate having two windows 39 and 40, for the body 26 and electrical connection means to be described.

The electronic unit 16 comprises elements which are adapted to provide for powering and controlling the pump laser sources 6, 9 and the optical meters 3, 13 in communication with the world outside, e.g. according to standard methods. Alternatively, such as where both the powering and controlling are performed using external apparatus of the amplifier due to special requirements, the electronic unit may just comprise electrical connections adapted to gather into a multipolar conductor run outside the various inputs and outputs of the lasers and the optical meters.

Figure 1:
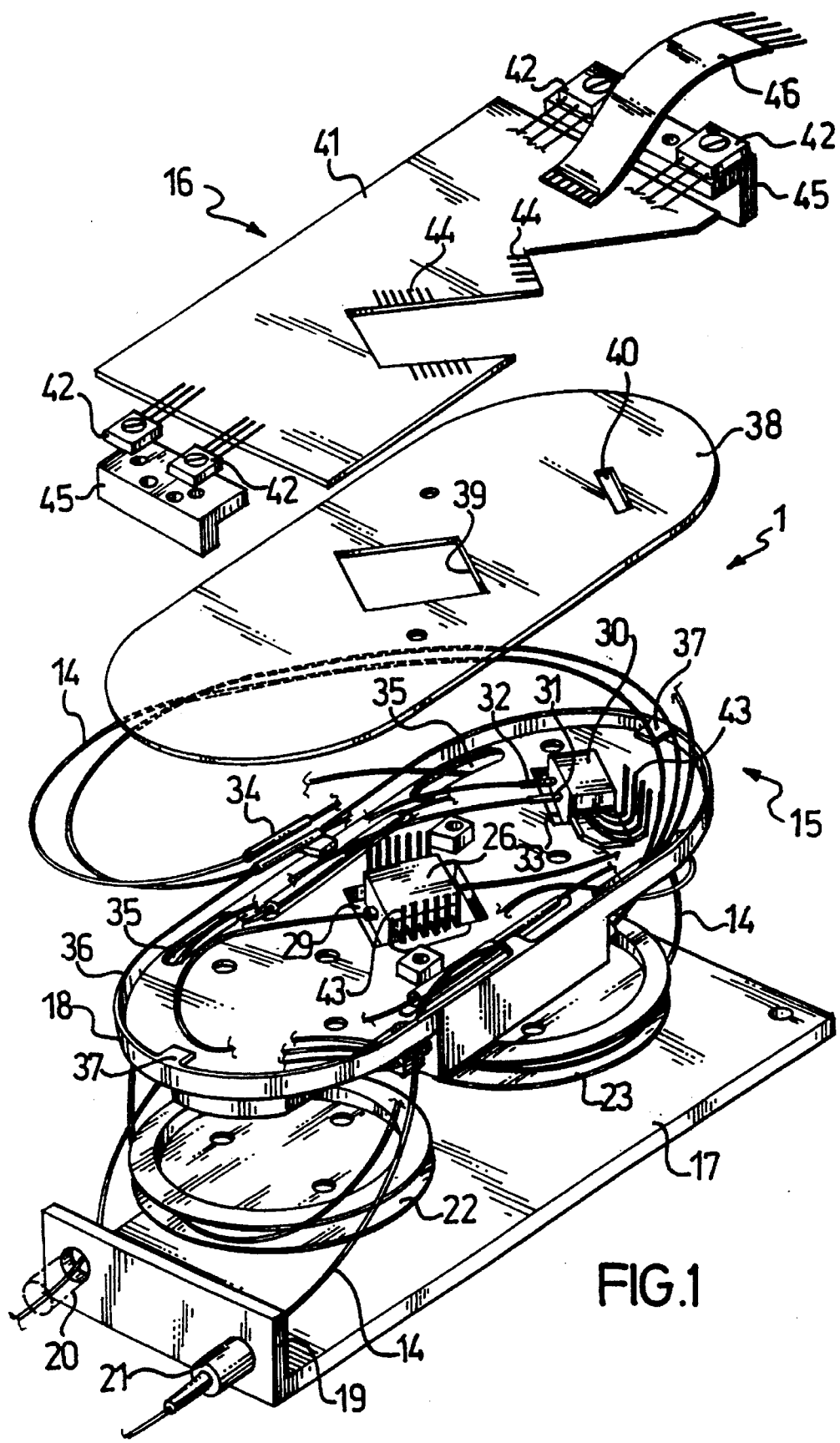
FIG. 1 is an exploded perspective view of an amplifier according to the invention.
Figure 3:
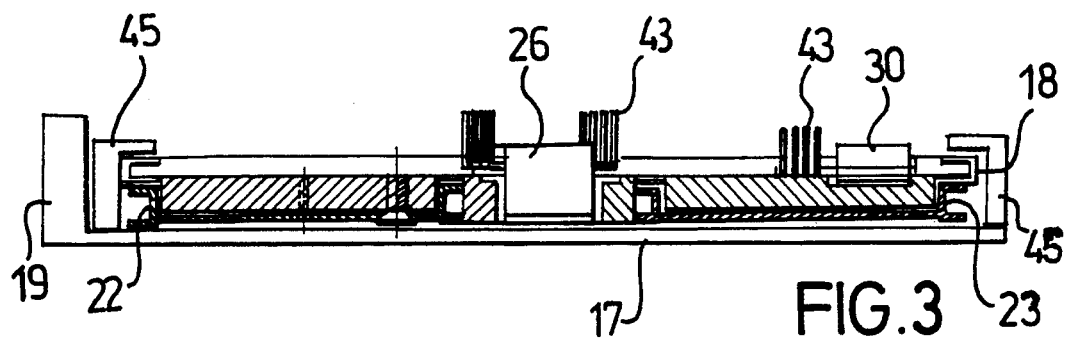
FIGS. 3 and 4 are sectional views of the organizer frame taken along lines III—III and IV—IV.
Figure 2:
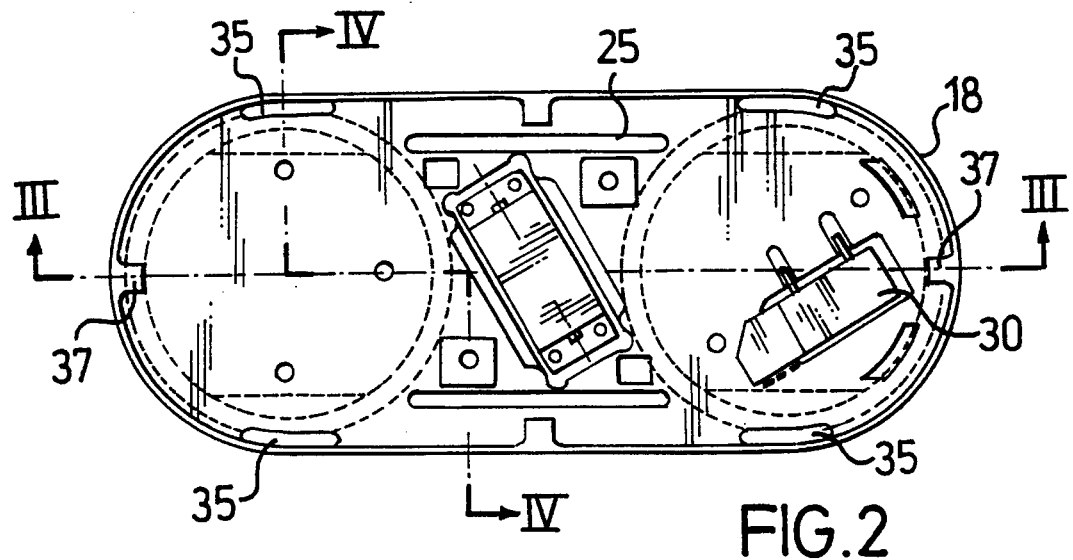
FIG. 2 is a plan view of the organizer frame for the amplifier shown in FIG. 1.
Figure 4:
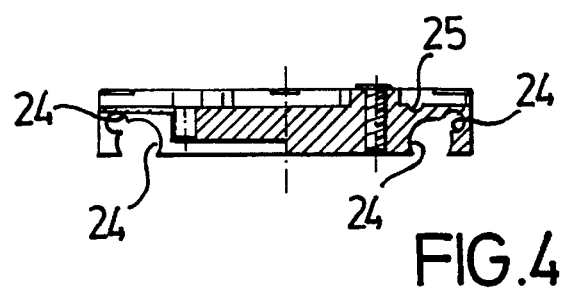

The electronic unit 16 further comprises an electronic board 41 incorporating conventional electrical and electronic components; these components may either be incorporated to the board 41 in printed or integrated circuit forms, or be discrete components carried on the exterior of the board 41, such as transistors 42. The transistors being in need of dissipating heat, have metal holders 45 arranged for direct contact with the plate 17, outside the frame 18. The board is electrically connected to the outside world via a multipolar cable 46. The holders 45 are, as shown in FIG. 3, bonded to the plate 17 and designed to hold the optical unit 15 securely on the plate 17.

The means of electrical connection between the optical 15 and electronic 16 units comprise pins 43 standing on the bodies 26, 30 and corresponding receiving and/of welding sockets 44 formed on the electronic board 41. The pins are connected, inside the bodies 26 and 30, to the lasers 6, 9 and the optical meters 3, 13, to electrically power them and lead out the values of the measurements taken; the sockets 44 are connected in the circuits of the board 41. The pins 43 stand upright on the optical unit 15 through the windows 39 and 40.

During the implementation stage of the amplifier 1, the two drums 22 and 23 (carrying the active light guide sections 7 and 10) are mounted on the underside of the organizer frame 18. Also mounted on the organizer frame 18 are the body 30 with the optical meters 3, 13; the dichroic couplers 5, 8; the directional couplers 2, 12; and the isolators 4, 11 if provided, all received in respective sockets 24 or 25.

The body 26 complete with the lasers 6 and 9, and as mounted on the organizer frame 18, is then bonded to the plate 17, through the window 29 in the organizer frame 18, when the latter is in turn secured on the plate 17.

All the light guide sections, namely the connection sections 14 and the ends of the active light guides 7 and 10, are routed above the frame 18 through the openings 35, and it is there that the necessary splices 34 will be made to implement a desired circuit diagram (such as one of those depicted in FIG. 5 or 6). To promote correct coupling, the various light guide sections may be suitably color-coded in accordance with a predetermined scheme.

Upon completion of the splices 34, the excess light guide lengths are laid into loose convolutions inside the edge 36, and the organizer frame 18 is applied the cover 38. The optical unit 15 is thus completed, with the pins 43 protruding from the cover 38 vertically upwards. It should be noted that located on the underside of the organizer frame 18 are just the optical components which can be arranged in a tidy fashion, whereas the "untidy" components (i.e., the excess light guide lengths and splices 34) are confined within the tray-like upper part.

The optical unit 15, as presently assembled, is ready to undergo the functional tests provided for it, and its performance can, therefore, be checked separately from the electronics, e.g. on dedicated testing equipment.

In a similar way, the electronic unit 16 is pre-assembled and can be inspected and tested as required. Thereafter, the two units may be assembled together, or stored for later assembly.

During the assembly process, the electronic unit 16 is merely laid over the optical unit 15. The pins 43 will be aligned to their respective connection sockets 44 into which they may either be driven or, better, soldered to establish electric contact.

An additional outer cover (not shown) is then applied to close the amplifier 1.

As will be appreciated from the foregoing description, the amplifier 1 assembling is greatly facilitated by the clear separation provided between the two units, i.e. the one to hold the optical components and the other the electrical or electronic components. Further, the added advantage is noteworthy that, during the assembly process, the light guide splicing can be carried out with all the light guides neatly laid onto the same plane.

The assembly operations are made uniquely easy and appropriate to industrial production methods also by that the optical components, including the active light guides, are pre-arranged members merely requiring, when the amplifier is assembled, that the respective connection light guides be spliced to it. Specifically, the light guides can be prepared in a separate shop as sections of suitable lengths, wound and held protected on their respective drums; the loaded drums can, therefore, be installed such that only the light guide portions which extend therefrom need to be handled, that is without unwinding and re-winding or otherwise manipulating the light guides.

In addition, the inventive construction enables the overall amplifier size to be curtailed as much as may be consistent with the minimum bending radius requirement for the light guides, i.e. close to within the outline of the pair of side-by-side drums 22, 23 carrying the active light guides.

The dichroic 5, 8 and directional 2, 12 couplers, moreover, can be orderly accommodated within the structure of the amplifier 1 despite their longitudinal dimension, without this imposing constraints on the layout of the associated connection light guide sections 14.

Finally, the central location of the lasers 6 and 9 is favorable to the dissipation of heat generated by the lasers. Indeed, with the plate 17 made preferably of a heat conducting material, its entire surface would take part in the dissipation of heat, to thereby bring about decreased temperature in the neighborhood of the body 26 while keeping relatively small the amplifier 1 size.

We claim:

1. An optical amplifier comprising:

an electronic unit comprising a plurality of electrically operable electronic components mounted on a support, said electronic unit being without optical components;

an optical unit comprising at least one active optical amplifying fiber, a laser pump for supplying pumping power to said fiber, optical coupling means coupling said pump to said fiber and light guide sections interconnecting optical components, all mounted on an organizer frame, said optical unit being without electronic components;

a plate intermediate said electronic unit and said optical unit, said plate having an aperture therein for the passage of electrical conductors; and electrical conductors extending from optical components on said organizer frame through said aperture to electronic components on said support whereby the electronic components can be assembled on said support independently of the assembly of said optical components on said organizer frame and the amplifier can be assembled by bringing the optical unit and the electronic unit together with said plate therebetween and providing electrical connections of said electrical conductors to the respective components.

2. An optical amplifier according to claim 1, wherein the optical (15) and electronic (16) units and said plate (38) are superimposed and the electrical conductors (43,44) extend substantially vertically from said organizer frame to said electronic components on said support.

3. An optical amplifier according to claim 2, wherein said support comprises an electronic circuit board (41).

4. An optical amplifier according to claim 3, wherein said electrical conductors comprise pins (43) extending vertically upwards from the optical unit (15) and further comprising mating receiving and/or soldering sockets (44) formed on said electronic circuit board (41).

5. An optical amplifier according to claim 1, wherein the optical components further include a directional coupler (2,12) associated with a respective optical meter (3,13), and an optical isolator (4,11), and wherein the optical unit (15) further comprises:

a base plate (17);

said organizer frame (18) is mounted on said base plate (17);

a winding drum (22,23), said active optical amplifying fiber (7,10), being wound on said drum which is mounted on the underside of the organizer frame (18);

a window (29) through the organizer frame (18) for securing the laser pump (26) on the plate (17), and extending through the organizer frame (18);

a socket (33) formed on the organizer frame (18) for securing the optical meter (3,13);

receiving sockets (24,25,34) formed on the organizer frame (18) for the optical coupling means (5,8), the directional coupler (2,12), and the insulator (4,11);

openings (35) formed through the organizer frame (18) to pass the light guide sections therethrough; and gathering means (36,37) provided on the organizer frame (18) top to gather up the connection light guide sections (14).

6. An optical amplifier according to claim 5, wherein the gathering means comprise a raised peripheral top edge (36) on the organizer frame resulting in the organizer frame (18) top having a substantially tray-like shape.

7. An optical amplifier according to claim 6, wherein the peripheral edge (36) is formed with inwardly projecting elevations.

8. An optical amplifier according to claim 5, wherein the pump laser source (6,9) is set askew centrally of the organizer frame (18) and the plate (17).

9. An optical amplifier according to claim 5, having two amplification stages and comprising two active optical amplifying fibers (7,10) and two winding drums (22,23), each fiber being stored on a respective one of two winding drums (22,23), said drums being mounted side-by-side on the underside of the organizer frame (18).

* * * * *